United States Patent Office 3,418,385
Patented Dec. 24, 1968

3,418,385
PROCESS FOR PREPARING 1-LITHIUM-1-
ALKYNES
David L. Skinner, Arlington Heights, Ill., and Donald
J. Peterson, Springfield Township, Ohio, assignors to
The Procter & Gamble Company, Cincinnati, Ohio, a
corporation of Ohio
No Drawing. Filed Sept. 27, 1966, Ser. No. 582,249
4 Claims. (Cl. 260—665)

This invention relates to a novel process for preparing certain organolithium compounds. More particularly, this invention relates to a novel process for preparing 1-lithium-1-alkynes.

Reaction processes for obtaining 1-lithium-1-alkynes are known, but generally these reaction processes are complicated. More importantly, these known reaction processes generally require a 1-alkyne as a starting material, and such a alkynes are not always readily available. Illustrative of these problems is the process of preparing lithium acetylides (1-lithium-1-alkynes) described in R. A. Raphael, Acetylenic Compounds in Organic Synthesis (Academic Press, New York, N.Y., 1955). In the process described there, a 1-alkyne is converted into a mercuride compound according to the following reaction $$2RC \equiv CH + K_2Hg I_4 + 2KOH \rightarrow (RC \equiv C)_2Hg + 4KI + 2H_2O$$

and the organic mercuride which is obtained is then reacted with lithium metal in hot dioxan solution to obtain the desired 1-lithium-1-alkyne $$RC \equiv CLi$$

Other equally complex processes for preparing 1-lithium-1-alkynes are known.

This invention has as its object the provision of a much improved novel process for producing certain 1-lithium-1-alkynes.

It is another object of this invention to provide 1-lithium-1-alkynes by a process that does not require 1-alkynes as starting raw materials, but instead employs more readily available alpha olefins, i.e., 1-alkenes.

The 1-lithium-1-alkynes which can be prepared by the process of this invention contain from about four to about twelve carbon atoms, and are represented by the formula $$RC \equiv CLi$$

wherein R is an alkyl group containing from about two to about ten carbon atoms.

It has been quite unexpectedly found that these 1-lithium-1-alkynes can be obtained by reacting finely divided lithium metal with a 1-alkene having a carbon chain length corresponding to the carbon chain length of the 1-lithium-1-alkyne desired to be obtained. A preferred process for effecting this recation comprises heating a 1-alkene containing a dispersion of finely divided lithium at a temperature of from about 20° C. to 175° C. for a period of from about .5 hour to about 40 hours. Most preferably the mixture of the 1-alkene and the finely divided lithium particles is heated to a reflux temperature or up to a temperature of not more than 100° C. for the higher boiling 1-alkenes. The reaction proceeds at higher temperatures, but undesirable side reactions occur. The reaction also proceeds at temperatures lower than those specified, but the yields are not as favorable as those obtained when higher temperatures are used.

The particles of lithium used in the reaction are finely divided so that the particles are 100 microns or less in size, preferably less than 100 microns. There is no limit on how small the lithium particles useful in the reaction can be, but particles as small as 1 micron are useful. Most preferably the lithium particles are from about 10 microns to about 90 microns in size.

The proportions in which the reactants, lithium particles and 1-alkene, are used is not critical. However, it is preferred to use an amount of the 1-alkene being reacted in excess of the amount that will react with lithium. A desirable, but not unduly large, excess of 1-alkene is provided by using from about 1 mole to about 2 moles of the 1-alkene being reacted per mole of lithium.

It is preferred, but not necessary, to agitate the reaction mixture, as for example by stirring, in order to mix the reactants well.

It is also preferred that the reaction be conducted under the atmosphere of a gas that will not, under conditions of the reaction, react with the lithium particles or the organolithium products of the reaction. The preferred gases for this purpose are the noble gases, preferably helium and neon, and most preferably argon.

The 1-alkenes which can be used in this invention range in carbon content from 4 to 12 carbons, including 1-butene, 1-pentene, 1-hexene, 1-heptene, 1-octene, 1-nonene, 1-decene, 1-undecene, and 1-dodecene. Certain of these 1-alkenes react very readily with finely divided lithium. In particular, 1-pentene, 1-hexene, and 1-heptene are readily converted in good yield to the corresponding 1-lithium-1-pentyne, 1-lithium-1-hexyne, and 1-lithium-1-heptyne by refluxing for from .5 to 8 hours the 1-alkene containing a quantity of finely divided lithium dispersed therein. The reaction between 1-butene and lithium particles also proceeds readily, but the procedure for this reaction differs slightly from the above procedure because 1-butene has a rather low boiling point. Because of the low boiling point of 1-butene it is preferred to conduct the reaction between 1-butene and lithium in an autoclave at from about 50° C. to about 100° C. The autoclave is preferably a rocking autoclave, since with such an autoclave the lithiumbutene mixture can be agitated.

It has also been discovered according to the present invention, that higher olefins containing from about 8 to about 12 carbon atoms can be made to react with lithium by employing a compound which promotes the reaction. Since pure olefins within this range do not readily react with lithium, it is necessary to promote the reaction. It has been surprisingly found that 1-alkenes containing from about eight to about twelve carbon atoms react with finely divided lithium in the process of this invention to give the corresponding 1-lithium-1-alkyne if the reaction is carried out in the presence of certain compounds having an active hydrogen that promotes the reaction. Such chemical compounds are designated herein as active hydrogen compounds. A suitable temperature range for the reaction between carbon-8 to carbon-12 olefins and lithium is from about 100° C. to about 175° C.

Active hydrogen compounds that are useful as chemical promoters in the process of this invention are (1) ammonia; (2) primary amines, preferably having an alkyl group containing from about one to about twelve carbon atoms, specific examples being methyl amine, propyl amine, and dodecyl amine; (3) secondary amines, preferably having alkyl groups with from about one to about twelve carbon atoms, the most preferred specific examples being dimethyl amine and methyl dodecyl amine; (4) water; (5) primary alcohols, preferably having an alkyl group containing from about one to about twelve carbon atoms, specific examples being propanol and dodecanol, the most preferred specific examples being methanol and ethanol; (6) secondary alcohols, preferably having alkyl groups containing from about one to about twelve carbon atoms, specific examples being 2-hexanol, 4-decanol, and 7-hexadecanol; (7) tertiary alcohols, preferably having alkyl groups containing from about one to about twelve carbon atoms, specific examples being 2-methyl-2-propanol, 3-methyl-3-decanol and 2-methyl-2-hexanol; (8) ammonium salts, preferably ammonium acetate, ammonium chloride, and ammonium bromide; (9) 1-alkynes, preferably having from about four to about seven carbon atoms, the most preferred specific examples being 1-butyne, 1-pentyne, and 1-hexyne; (10) anhydrous hydrogen chloride gas, and the like. Just why these compounds promote the reaction is unknown, but compounds with active hydrogen atoms appear to be the compounds that are efficacious as promoters. Many compounds will promote the reaction, but those listed above can be especially useful.

Generally only a small amount, from about one mole percent to about fifteen mole percent, preferably from about five mole percent to about ten mole percent, based on the amount of lithium present, of the chemical promoter is employed. The promoter can all be added to the 1-alkene before the lithium dispersion is added to the reaction mixture; however, the promoter is preferably utilized by adding it slowly to the heated reaction mixture over a period of from about 0.5 hour to 10 hours. Gaseous promoters, such as hydrogen chloride, are introduced below the surface of the reaction mixture, while liquid and solid promoters, such as water and ammonium acetate, are dropped on the surface of the reaction mixture. It is possible, of course, to add the promoter in many other ways, since the method of adding the promoter is not critical.

By using a chemical promoter, it is possible to utilize the process of this invention as herebefore described to convert 1-octene, 1-nonene, 1-decene, 1-undecene, and 1-dodecene to the corresponding 1-lithium-1-octyne, 1-lithium-1-nonyne, 1-lithium-1-decyne, 1-lithium-1-undecyne, and 1-lithium-1-dodecyne.

The novel reaction process of this invention can be represented as follows:

wherein R is an alkyl group containing from about two to about ten carbon atoms. The reaction appears to require four lithium atoms per 1-alkene molecule converted. A very valuable by-product of the reaction is lithium hydride, a product which is known to have many valuable uses. The novel reaction process disclosed herein is an especially valuable process for obtaining lithium hydride because the process is simple and the reaction conditions are mild. Along with the 1-lithium-1-alkyne small amounts of the corresponding 1-lithium-1-alkene (generally less than 5%) are also produced. While the exact mechanism of the reaction process of this invention is unknown, the following sequence of equations is presented as a possible course of the reaction process:

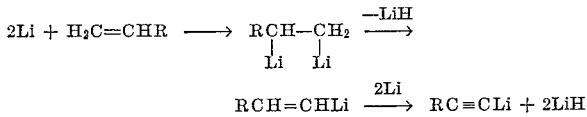

In this reaction sequence, R is an alkyl group containing from about two to about ten carbon atoms.

The process described hereinbefore is novel. While the literature contains many reports describing reactions of alkali metals with olefins containing double bonds in conjugation with a center of unsaturation (see G. E. Coates, "Organo-Metallic Compounds," 2nd ed., John Wiley and Sons, Inc., New York, 1960, pp. 27–42), no reaction of the sort disclosed herein has heretofore been reported.

The process of this invention is useful in that it produces 1-lithium-1-alkynes containing from about four to about twelve carbon atoms.

The 1-lithium-1-alkynes of this invention are useful compounds for they are valuable intermediates to many useful acetylenic compounds. The following reactions involving 1-lithium-1-alkynes are given merely to illustrate the versatile nature of these compounds as intermediates, and should in no way be considered as limiting since many other uses are known, and will be obvious to those skilled in the art.

The 1-lithium-1-alkynes of this invention are convenient intermediates to the corresponding 1-alkynes. These 1-alkynes can be obtained by hydrolyzing the 1-lithium-1-alkynes of this invention according to the general equation

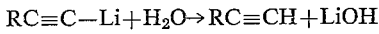

Alkynes with internal unsaturation can also be prepared by reacting the 1-lithium-1-alkynes of this invention with the appropriate alkyl halide according to the equation

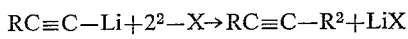

wherein $R^2$ is an alkyl group, and X is a halogen selected from the group consisting of chlorine, bromine, and iodine.

The 1-lithium-1-alkynes of this invention are useful in the preparation of $\Delta2,3$-alkynoic acids having from about five to about thirteen carbon atoms. These acetylenic carboxylic acids are prepared from the 1-lithium-1-alkynes of this invention by reacting the 1-lithium-1-alkyne with carbon dioxide, and then hydrolyzing the resultant product. This reaction process is illustrated by the following equations:

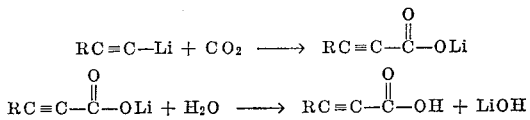

The alkynoic acids which are prepared by utilizing the 1-lithium-1alkynes of this invention are useful bactericides and fungicides. These alkynoic acids themselves are also useful as intermediates to other chemical compounds of commercial value. It is well-known for example that the simple esters of $\Delta2,3$ - octynoic and $\Delta2,3$ - nonynoic acids have an odor resembling that of violets and have found commercial application as perfumes. See, Johnson, Acetylenic Compounds, vol. II (Longmans, Green & Co., 1950), p. 97.

The 1-lithium-1-alkynes of this invention are also useful in the preparation of certain organosilanes, especially acetylenic organosilanes such as those disclosed in U.S. Patent 2,671,795. These organosilanes are prepared from the 1-lithium-1-alkynes of this invention by reacting the 1-lithium-1-alkyne with an organohalosilane according to the equation

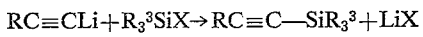

wherein $R^3$ is a monovalent hydrocarbon radical, including saturated aliphatic radicals (specific examples being methyl and dodecyl), unsaturated aliphatic radicals (specific examples being vinyl and allyl), aryl radicals (specific examples being phenyl and naphthyl), and alkylaryl radicals (specific examples being benzyl and phenylbutyl), and wherein X is a halogen selected from the group consisting of chlorine, bromine, and fluorine. Acetylenic silicon products such as those obtained from the above-mentioned reaction are disclosed in the above-mentioned patent to be useful starting materials for various polymeric compositions. It is further disclosed that these materials may be polymerized with various vinyl polymerization type catalysts, e.g., benzoyl peroxide, to make polymeric materials having utility as insulating or dielectric media.

The organolithium compounds of this invention are much like Grignard reagents in that they are highly reactive, and are useful primarily as intermediates to other compounds. The compounds are distinct chemical entities, but because they are so reactive it is not generally useful or practical to isolate these compounds.

The following examples describe with particularity the performance of the invention described hereinbefore. It will be obvious to those skilled in the art that the invention can be performed in numerous other ways. These examples are, therefore, given by way of illustration and not by way of limitation.

EXAMPLES 1–7

The lithium used in the following examples was purchased from the Foote Mineral Company in the form of particles 100 microns or smaller in size dispersed in paraffin oil. Olefins were used as received from the supplier and were not purified before use. The lithium metal dispersion was washed twice with hexane and once with the olefin with which it was to be reacted. The lithium was then washed into a flask with the desired amount of 1-alkene. The flask was equipped with a magnetic stirrer, thermometer, and condenser. The contents were maintained under an atmosphere of argon, and the temperature was maintained as indicated. The reaction mixture was rapidly stirred by means of the magnetic stirrer. After the indicated length of time had passed, the reaction mixture was allowed to cool. The highly reactive 1-lithium-1-alkyne formed was then converted into a useful acetylenic carboxylic acid by carbonation and hydrolysis by the following process. The slurry obtained from the reaction of lithium and 1-alkene was poured over Dry Ice. The product obtained was hydrolyzed by very careful (slow) addition to ice. This fluid mixture separated into two distinct phases. The organic phase was separated from the aqueous phase and dried over $MgSO_4$ after water washing. The water layers were combined and acidified with concentrated HCl, extracted with ethyl ether, and the aqueous phase discarded. The ether extract was dried over $MgSO_4$ and the ether removed under reduced pressure. Examples 1–7 give the conditions and the yields obtained in a number of runs in which 1-alkenes were reacted according to the above procedure.

| Ex. | Moles of lithium | 1-alkene | Moles of 1-alkene | Temp., °C. | Time, hrs. | 1-lithium-1 alkyne | Alkynoic acid | Percent yield of acid |
|---|---|---|---|---|---|---|---|---|
| 1 | 0.1 | $n\text{-}C_3H_7\text{---}CH=CH_2$ | 0.5 | 40 | 2 | $n\text{-}C_3H_7\text{---}C\equiv CLi$ | $n\text{-}C_3H_7\text{---}C\equiv C\text{---}COOH$ | 54 |
| 2 | 1.0 | $n\text{-}C_4H_9\text{---}CH=CH_2$ | 0.4 | 71 | 1 | $n\text{-}C_4H_9\text{---}C\equiv CLi$ | $n\text{-}C_4H_9\text{---}C\equiv C\text{---}COOH$ | 60 |
| 3 | 1.0 | $n\text{-}C_4H_9\text{---}CH=CH_2$ | 0.2 | 71 | 1 | $n\text{-}C_4H_9\text{---}C\equiv CLi$ | $n\text{-}C_4H_9\text{---}C\equiv C\text{---}COOH$ | 65 |
| 4 | 0.8 | $n\text{-}C_4H_9\text{---}CH=CH_2$ | 0.1 | 69 | 2 | $n\text{-}C_4H_9\text{---}C\equiv CLi$ | $n\text{-}C_4H_9\text{---}C\equiv C\text{---}COOH$ | 73 |
| 5 | 1.0 | $n\text{-}C_6H_{13}\text{---}CH=CH_2$ | 0.5 | 123 | 16 | $n\text{-}C_6H_{13}\text{---}C\equiv CLi$ | $n\text{-}C_6H_{13}\text{---}C\equiv C\text{---}COOH$ | 39 |
| 6 | 1.0 | $n\text{-}C_8H_{17}\text{---}CH=CH_2$ | 1.0 | 112 | 24 | $n\text{-}C_8H_{17}\text{---}C\equiv CLi$ | $n\text{-}C_8H_{17}\text{---}C\equiv C\text{---}COOH$ | Trace |
| 7 | 1.0 | $n\text{-}C_{10}H_{21}\text{---}CH=CH_2$ | 1.0 | 160 | 40 | $n\text{-}C_{10}H_{21}\text{---}C\equiv CLi$ | $n\text{-}C_{10}H_{21}\text{---}C\equiv C\text{---}COOH$ | Trace |

EXAMPLE 8

The lithium used in the reaction was purchased from the Foote Mineral Company in the form of lithium particles 100 microns or less in size dispersed in paraffin oil. The apparatus for conducting the reaction consisted of a 3-necked round bottom Grignard flask that had a sintered glass filter incorporated into the taper of the flask immediately above the stopcock. This apparatus allowed the removal, under argon, of the protective paraffin oil from the air-sensitive lithium particles by successive washings with hexane and the 1-alkene employed in the reaction. This Grignard flask was fitted with a condenser, a stirrer, and a thermometer. Heating was effected by means of a lamp. Using the above-mentioned apparatus, the procedure employed was as follows. To the modified Grignard flask an amount of lithium dispersed in paraffin was added, so that when the paraffin oil was washed away 1.75 g. (0.25 g. atom) of lithium would be left in the flask. When the paraffin-lithium dispersion was added to the flask, the flask was flushed with argon, and the paraffin-lithium dispersion was then washed successively with two 50 ml. portions of hexane, and 20 ml. of the 1-alkene employed (in this case 1-hexene). After washing, 70 ml. (47 g., 0.56 mole) of 1-hexene was added and this mixture was heated to about 63° C. for 1.5 hours. The reaction mixture was stirred vigorously during this time. The mixture was allowed to cool. The highly reactive 1-lithium-1-hexyne formed was then converted into a useful organosilane derivative according to the following procedure. There was added to the cooled reaction mixture 15 ml. of tetrahydrofuran to facilitate the following reaction with chlorotrimethylsilane. The mixture was stirred briefly, and 8.5 g. (0.08 mole) of chlorotrimethylsilane was then added dropwise, resulting in an exothermic reaction. The mixture was stirred for about one hour. The liquid portion of the reaction mixture was then drained into chilled aqueous ammonium chloride. The organic phase was extracted with ethyl ether, dried over sodium sulfate, concentrated, and distilled under vacuum. A reaction product containing 6.01 g. of 1-hexynyltrimethylsilane was obtained.

EXAMPLE 9

Employing the apparatus and procedure employed in Example 8, 1.4 g. (0.2 g. atom) of lithium particles 100 microns or less in size dispersed in paraffin oil were washed free of protective paraffin oil and reacted with 60 ml. (38.4 g., 0.55 mole) of 1-pentene by heating the mixture of lithium particles and 1-pentene to about 40° C. for 1.5 hours to form 1-lithium-1-pentyne. The 1-lithium-1-pentyne formed was then treated with 5 ml. of tetrahydrofuran and 8.5 g. (0.08 mole) of chlorotrimethyl silane according to the procedure employed in Example 8 to give 2.66 g. of the useful organosilane derivative, 1-pentynyltrimethylsilane.

EXAMPLE 10

Employing the apparatus and procedure employed in Example 8, 1.75 g. (0.25 g. atom) of lithium particles 100 microns or less in size dispersed in paraffin oil were washed free of the protective paraffin oil and reacted with 53 ml. (37 g., 0.38 mole) of 1-heptene by heating the mixture of lithium particles and 1-heptene to about 95° C. for 1.25 hours to form 1-lithium-1-heptyne. The 1-lithium-1-heptyne formed was then treated with 10 ml. of tetrahydrofuran and 8.5 g. (0.08 mole) of chlorotrimethylsilane according to the procedure employed in Example 8 to give 4.1 g. of the useful organosilane derivative 1-heptynyltrimethylsilane.

EXAMPLE 11

The apparatus employed in Example 8 was fitted with means for adding a liquid dropwise to the reaction mixture. Employing this modified apparatus and the procedure employed in Example 8, 1.75 g. (0.25 g. atom) of lithium particles 100 microns or less in size dispersed in paraffin oil were washed free of the protective paraffin oil and reacted with 70 ml. (50 g., 0.45 mole) of 1-octene by heating the mixture of lithium particles and 1-octene to about 100° C. Over a period of 1 hour 0.4 g. (0.022 mole) of water (a chemical promoter) was added dropwise to the reaction mixture. The reaction mixture was stirred while temperature was maintained at 100° C., for an additional 1.5 hours and then allowed to cool to room temperature. The 1-lithium-1-octyne formed was then treated with 15 ml. of tetrahydrofuran and 8.5 g. (0.08 mole) of chlorotrimethylsilane according to the procedure employed in Example 8 to give 5.2 g. of the useful organosilane derivative 1-octynyltrimethylsilane.

EXAMPLE 12

When in Example 11, 0.022 mole of the following chemical promoters are substituted for water, substantially the same results can be obtained in that 1-lithium-1-octyne is formed and the useful organosilane 1-octynyltrimethylsilane is obtained: ammonia, methylamine, dimethylamine, methyldodecylamine, methanol, ethanol, 2-hexanol, 3-methyl-3-decanol, ammonium acetate, 1-hexyne, anhydrous hydrogen chloride gas (the gas being added at a constant rate below the surface of the olefin by a power-driven syringe).

EXAMPLE 13

Employing the apparatus and procedure employed in Example 11, 1.75 g. (0.25 g. atom) of lithium particles 100 microns or less in size dispersed in paraffin oil were washed free of the protective paraffin oil and reacted with 50 ml. (37 g., 0.26 mole) of 1-decene by heating the mixture of lithium particles and 1-decene to about 100° C. Over a period of 1 hour, 0.35 g. (0.02 mole) of water (a chemical promoter) was added dropwise to the reaction mixture. After 35 hours total reaction time the reaction mixture was cooled to room temperature. The 1-lithium-1-decyne formed was treated with 15 ml. of tetrahydrofuran and 8.5 g. (.08 mole) of chlorotrimethylsilane according to the procedure employed in Example 8 to give 1.9 g. of 1-decynyltrimethylsilane.

EXAMPLE 14

When in Example 13, 0.022 mole of the following chemical promoters are substituted for water, substantially the same results can be obtained in that 1-lithium-1-decyne is formed and the useful organosilane 1-decynyltrimethylsilane is obtained: ammonia, methylamine, dimethylamine, methyldodecylamine, methanol, ethanol, 2-hexanol, 3-methyl-3-decanol, ammonium acetate 1-hexyne, anhydrous hydrogen chloride gas (the gas being added at a constant rate below the surface of the olefin by a power-driven syringe).

EXAMPLE 15

When in Example 13, 0.26 mole of 1-dodecene is substituted for 1-decene, 1-lithium-1-dodecyne is obtained which is readily converted to the useful organosilane derivative, 1-dodecyltrimethylsilane.

EXAMPLE 16

When in Example 15, 0.022 mole of the following chemical promoters are substituted for water, substantially the same results can be obtained in that 1-lithium-1-dodecyne is formed and the useful organosilane 1-dodecyltrimethylsilane is obtained: ammonia, methylamine, dimethylamine, methyldodecylamine, methanol, ethanol, 2-hexanol, 3-methyl-3-decanol, ammonium acetate, 1-hexyne, anhydrous hydrogen chloride gas (the gas being added at a constant rate below the surface of the olefin by a power-driven syringe).

EXAMPLE 17

A mixture of 3.5 g. (0.5 g. atom) of lithium particles 100 microns or less in size (which had been washed free of protective paraffin oil) and an excess of 1-butene was heated at 50° C. for 16 hours in a rocking autoclave. After exhausting the excess 1-butene, the bomb liner was removed, and cooled to room temperature. The contents, which contained the 1-lithium-1-butyne formed, were treated with 50 ml. tetrahydrofuran and 17 g. (0.16 mole) of chlorotrimethylsilane. About 0.11 g. of 1-butynyltrimethylsilane was obtained.

In all chemical formulae appearing herein R is designated to be an alkyl group containing from about two to about ten carbon atoms, unless otherwise specified.

What is claimed is:

1. A process for preparing 1-lithium-1-alkynes of the formula $$RC \equiv CLi$$

wherein R is an alkyl group containing from about 2 to about 10 carbon atoms comprising reacting (1) a 1-alkene compound having from about 4 to about 12 carbon atoms, and (2) finely divided lithium at a temperature of from about 20° C. to about 175° C.

2. The process of claim 1 wherein the particles of lithium are 100 microns or less in size.

3. The process of claim 1 wherein the 1-alkene compound has from about 4 to about 8 carbon atoms.

4. A process for preparing 1-lithium-1-alkynes of the formula $$RC \equiv CLi$$

wherein R is an alkyl group containing from about 6 to about 10 carbon atoms comprising reacting (1) a 1-alkene compound having from about 8 to about 12 carbon atoms, and (2) finely divided lithium having a particle size of 100 microns or smaller in presence of an active hydrogen compound at a temperature of from about 100° C. to about 175° C.

References Cited

UNITED STATES PATENTS 3,053,911   9/1962   Viehe _____ 260—665

OTHER REFERENCES

Kirk-Othmer: Encyclopedia of Chemical Technology, Interscience Encyclopedia Inc., New York, 1951 ed., vol. 7, p. 641.

TOBIAS E. LEVOW, Primary Examiner.

A. P. DEMERS, Assistant Examiner.

U.S. Cl. X.R.

23—204; 167—22; 260—448.2, 486, 533, 678